United States Patent [19]
Hachisuka et al.

[11] Patent Number: 4,463,820
[45] Date of Patent: Aug. 7, 1984

[54] POWER ASSISTED STEERING MECHANISM

[75] Inventors: Hiroshi Hachisuka, Nishio; Fumiharu Kuga, Toyota, both of Japan

[73] Assignee: Aisin Seiki Kabushiki Kaisha, Kariya, Japan

[21] Appl. No.: 435,939

[22] Filed: Oct. 22, 1982

[30] Foreign Application Priority Data

Oct. 30, 1981 [JP] Japan .................................. 56-174138
Oct. 30, 1981 [JP] Japan .................................. 56-174139

[51] Int. Cl.³ .............................................. B62D 5/06
[52] U.S. Cl. .................................................... 180/143
[58] Field of Search ................ 180/143, 142, 141, 132

[56] References Cited

U.S. PATENT DOCUMENTS 2,996,136 9/1961 Nallinger et al. .................... 180/143
4,384,631 5/1983 Suzuki ................................. 180/143

FOREIGN PATENT DOCUMENTS 3048966 9/1981 Fed. Rep. of Germany ...... 180/143
53-4928 1/1978 Japan ................................... 180/143

Primary Examiner—Joseph F. Peters, Jr.
Assistant Examiner—Kenneth R. Rice
Attorney, Agent, or Firm—Oblon, Fisher, Spivak, McClelland & Maier

[57] ABSTRACT

A power assisted steering mechanism comprises a power piston in engagement with sector and worm shafts, right and left cylinders selectively receiving the fluid under pressure to thereby assist the movement of the power piston, and a control valve means incorporated within the power piston to selectively transmit the fluid under pressure into said right and left cylinders. The control valve means comprises a slidable valve piston positioned so as to define a pair of primary reaction chambers and a pair of secondary reaction chambers, the primary reaction chambers being in fluid communication with the secondary reaction chambers through means of orifices, respectively, and the secondary reaction chambers being connected to each other through means of a variable orifice which reduces the fluid communication therebetween in response to a speed of the vehicle.

5 Claims, 4 Drawing Figures

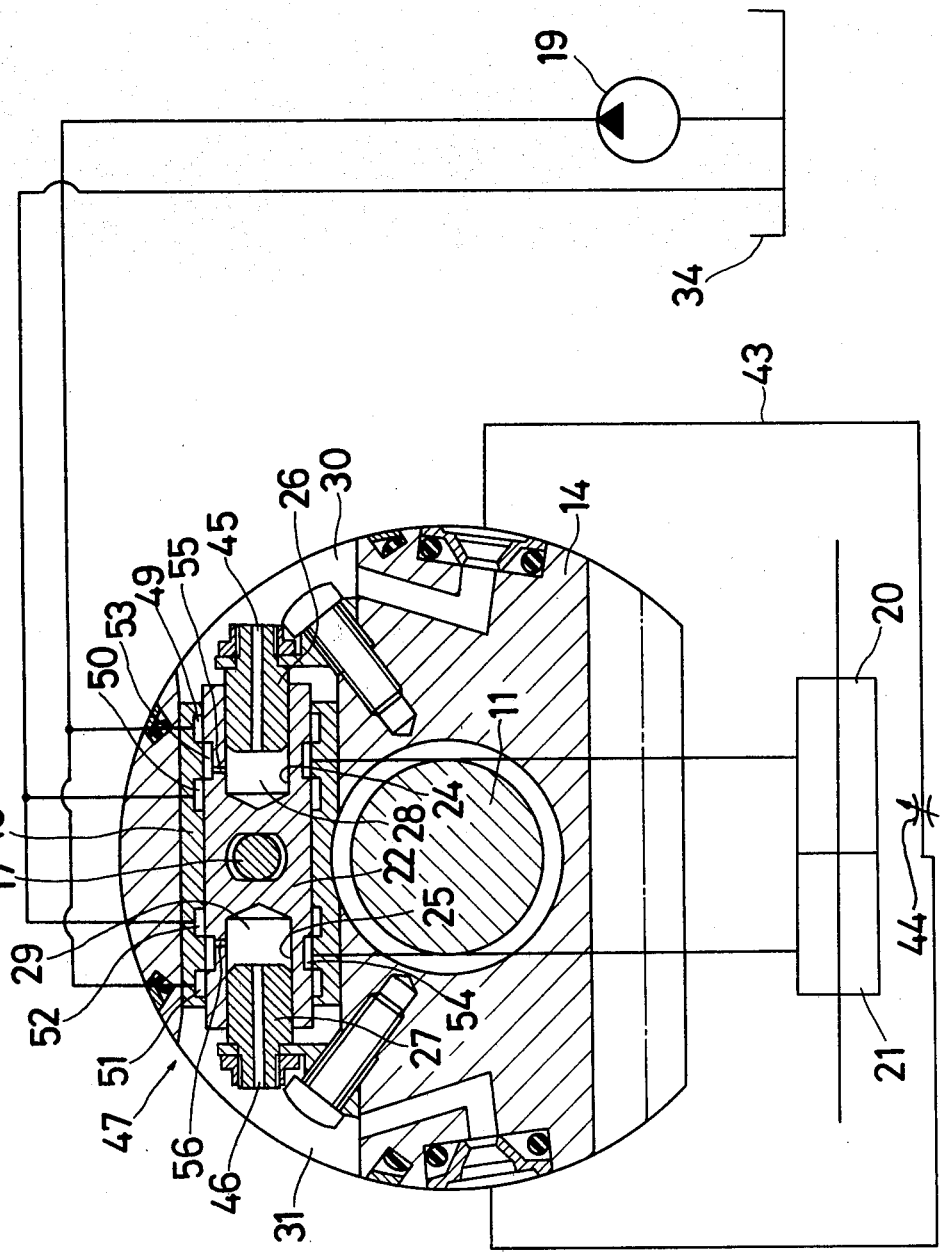

POWER ASSISTED STEERING MECHANISM

BACKGROUND OF THE INVENTION

1. Field of the Invention

The invention relates to power assisted steering mechanisms for vehicles and more particularly to power assisted steering mechanisms for vehicles in which a steering force is changed in response to a speed of the vehicle.

2. Description of the Prior Art

Conventionally, various power assisted steering mechanisms have been proposed in which the manual steering is assisted by the fluid under pressure. At high speed, however, it is desirable to avoid the oversteering by the power assisted steering mechanism to increase the safety during vehicle travel. Therefore, the prior steering mechanisms have independent and individual reaction generating means which function at high and low vehicle speeds, respectively. This results in complex in construction and in high in cost.

SUMMARY OF THE INVENTION

Therefore, it is an object of the present invention to provide a new and improved power assisted steering mechanism which obviates the above-mentioned prior art drawbacks.

It is another object of the present invention to provide a new and improved power assisted steering mechanism which is simple in construction and is low in cost.

BRIEF DESCRIPTION OF THE DRAWINGS

Various other objects, features and attendant advantages of the present invention will be more fully appreciated as the same becomes better understood from the following detailed description when considered in connection with the accompanying drawings wherein:

FIG. 4 is a view similar to FIG. 2, but showing a modification of the present invention.

DETAILED DESCRIPTION OF THE PREFERRED EMBODIMENTS

Figure 1:
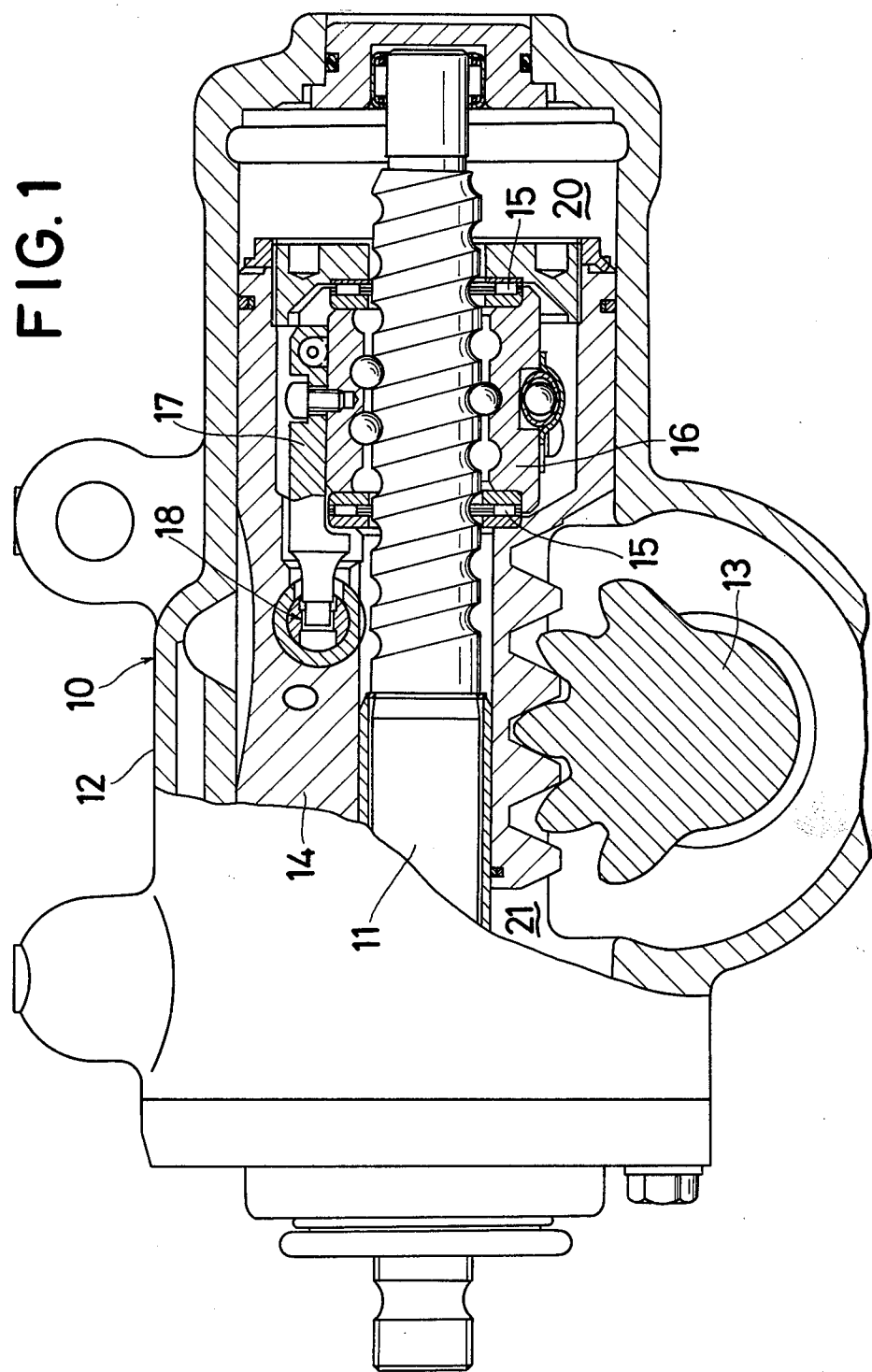
FIG. 1 is a cross-sectional view of a power assisted steering mechanism according to the present invention.
Figure 2:
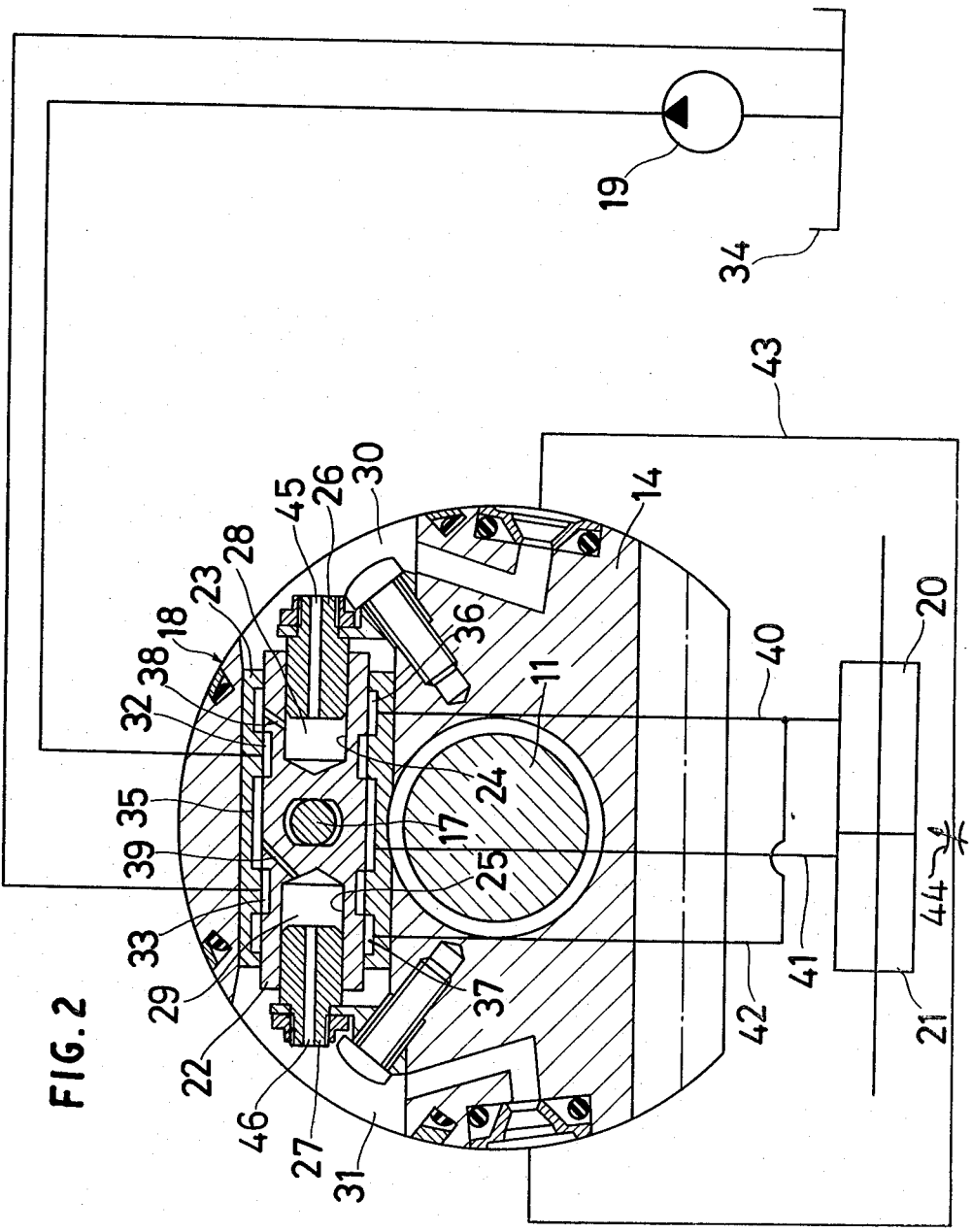
FIG. 2 is a cross-sectional view of a control valve means which is incorporated in the power assisted steering mechanism of FIG. 1.
Figure 3:
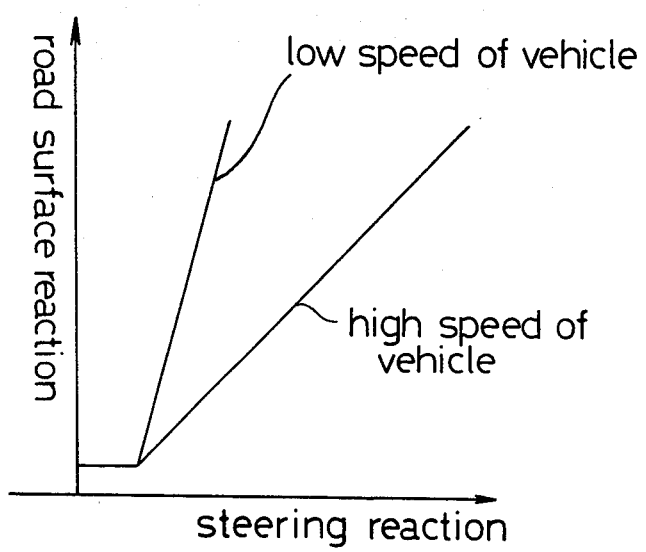
FIG. 3 is a graph showing a relation between a road surface reaction and a steering reaction.

Referring to FIGS. 1 to 3 showing a first embodiment of the present invention, a power assisted steering mechanism 10 includes a worm shaft 11 both ends of which are rotatably supported by and in a housing 12 and a sector shaft 13 which is in engagement with a rack of a power piston 14. One end of the worm shaft 11 is in association with a steering wheel (not shown) and the sector shaft 13 is operatively connected to a link mechanism (not shown) to thereby change directions of wheels. The worm shaft 11 is supported at both sides thereof within the power piston 14 by thrust bearing means 15 and is in operatively engagement with the power piston 14 through means of a steering nut 16 and ball means to restrict an axial movement of the shaft 11 to the power piston 14. Thus, the steering nut 16 only rotates within the power piston 14, but can not move in its axial direction. Secured to the steering nut 16 is a valve pin 17 a left end of which is positioned within a control valve means 18 which is, in turn, incorporated within the power piston 14. The control valve means 18 selectively supplies a fluid under pressure from a pump 19 to one of a right cylinder chamber 20 and a left cylinder chamber 21 which are respectively defined within the housing 12 by means of the power piston 14, whereby the movement of the power piston 14 along the worm shaft 11 is assisted.

In the power assisted steering mechanism 10 as shown in FIG. 1, when the driver rotates the steering wheel in the right direction, the worm shaft 11 and steering nut 16 rotate together in the same direction. Therefore, the valve pin 17 is also rotated in the same direction to thereby cause a valve piston 22 of the control valve means 18 to move to the right so that the fluid under pressure will be transmitted to the right chamber 20. Thus, the leftward movement of the power piston 14 will be assisted by the fluid under pressure within the chamber 20 whereby the sector shaft 13 in engagement with the power piston 14 will easily be moved. Upon turning the steering wheel in the left or opposite direction, the worm shaft 11, the steering nut 16 and the valve pin 17 are rotated in the left direction, and therefore, the fluid under pressure will be transmitted to the left chamber 21. As a result, the rightward movement of the power piston 14 will be assisted by the fluid under pressure within the chamber 21.

As best seen in FIG. 2, the control valve means 18 has the valve piston 22 which is slidably positioned within a cylinder 23, the valve piston 22 having a central hole in which the end of the valve pin 17 is received. The valve piston 22 has right and left bores 24 and 25 in which reaction pistons 26 and 27 are positioned so as to define primary reaction chambers 28 and 29, respectively. The reaction pistons 26 and 27 are secured to the power piston 14. At both sides of the cylinder 23, secondary reaction chambers 30 and 31 are formed, respectively. A pressure working area of each of the secondary reaction chambers 30 and 31 is greater than that of each of the primary reaction chambers 28 and 29. The outer surface of the valve piston 22 has a pair of axially spaced annular grooves 32 and 33, the groove 32 being in fluid communication with the oil pump 22 while the groove 33 being in fluid communication with an oil reservoir 34.

Inner surface of the cylinder 23 has a central annular groove 35 and right and left annular grooves 36 and 37, the grooves 36 and 37 being spaced from groove 35, respectively. The groove 36 is in fluid communication with the primary reaction chamber 28 through means of an orifice 38 while the central groove 35 is in fluid communication with the primary reaction chamber 29 through means of an orifice 39. The groove 36 also is fluidically connected to the cylinder chamber 20 through means of a passage 40 while the central groove 35 is fluidically connected to the cylinder chamber 21 through means of a passage 41. The passage 40 is in fluid communication with the groove 37 through means of a passage 42. The secondary reaction chamber 30 and 31 are in communication to each other via a passage 43 having a variable orifice 44 therein, the variable orifice 44 functions so as to restrict the fluid communication between the chambers 30 and 31 as a speed of the vehicle increases and functions so as to interrupt the fluid communication between the chambers 30 and 31 when the speed of the vehicle exceeds a predetermined value. Thus, the fluid under pressure within one of the secondary chambers 30 and 31 is increased to thereby make a difference in pressures between both chambers 30 and 31 when the speed of the vehicle is high. Therefore, the relatively large reaction force acting on the valve piston 22 will be produced.

The secondary reaction chamber 30 is in fluid communication with the primary reaction chamber 28 through means of an orifice 45 formed in the reaction piston 26 while the secondary reaction chamber 31 is in fluid communication with the primary reaction chamber 29 through means of an orifice 46 formed in the piston 27.

Upon moving the valve piston 22 in the right direction of FIG. 2 when the speed of the vehicle is low or below the predetermined value, the groove 32 of the valve piston 22 is brought in communication with the groove 36 of the cylinder 23. Thus, the fluid under pressure from the pump 19 is transmitted to the cylinder chamber 20 via the passage 40 to thereby assist the movement of the power piston 14. Now, since the variable orifice 44 establishes the fluid communication between the secondary reaction chambers 30 and 31, the fluid pressure within the chamber 30 is the same as that within the chamber 31 and, thus, no reaction force acting on the valve piston 22 is produced by the fluid under pressure within the chamber 30. The primary reaction chamber 28 receives the fluid under pressure since the chamber 28 is in fluid communication with the groove 36 through means of the orifice 38. The fluid under pressure within the chamber 28 will be leaked through means of the orifice 45 the variable orifice 44 and the orifices 46 and 39 and will be lower than the pump pressure. Thus, the small reaction force acting on the valve piston 22 will be produced. During the above operation, the central groove 35 is brought in communication with the groove 33 of the valve piston 22 and the left cylinder chamber 21 is brought in communication with the reservoir 34. The reaction chamber 29 receives the fluid under pressure leaked from the reaction chamber 28, however, the fluid under pressure within the chamber 29 will not be pressurized since the chamber 29 is in communication with the reservoir 34 via the orifice 39. Thus, the difference in pressures between the cylinder chambers 20 and 21 will assist the movement of the power piston 14, and the difference in pressures between the primary reaction chambers 28 and 29 will produce the reaction force acting on valve piston 22.

When the speed of the vehicle is high or exceeds the predetermined value, the variable orifice 44 closes to thereby interrupt or restrict the fluid communication between the secondary reaction chambers 30 and 31. Under these conditions, when the valve piston 22 is moved to the right, the groove 32 of the valve piston 22 is brought in communication with the groove 36 of the cylinder 23 so that the fluid under pressure from the pump 19 will be transmitted to the cylinder chamber 20. The primary reaction chamber 28 now receives the fluid under pressure via the orifice 38 while the secondary reaction chamber 30 receives the fluid under pressure via the orifice 45. The fluid under pressure within the cylinder chamber 20 assists the movement of the power piston 14. Since the groove 33 is brought in communication with the central groove 35, left cylinder chamber 21, primary reaction chamber 29 and secondary reaction chamber 31 are brought in communication with the oil reservoir 34. The groove 37 of the cylinder 23 is interrupted from other grooves by means of land of the valve piston 22. The reaction chambers 28 and 30 receive the fluid under pressure while the reaction chambers 29 and 31 are in communication with the reservoir 34 and, therefore, the difference in pressures therebetween will be generated. Thus, the large reaction force acting on the valve piston will be produced since the pressure working area of the secondary reaction chamber 30 is larger than that of the primary reaction chamber 28. This will be clearly illustrated in FIG. 3. The operation of the control valve means, when the valve piston 22 is moved to the left, will be easily understood since the construction thereof is bisymmetry and, therefore, the detailed explanation will be omitted.

Turning to FIG. 4 showing a modification of the present invention, parts which are the same as those of the previous embodiment are illustrated by the same reference numerals and, therefore, the detailed explanation will be omitted.

A control valve means 47 includes a cylinder 48 which has at an inner surface thereof annular grooves 49, 50, 51 and 52, the grooves 49 and 51 being in fluid communication with the oil pump 19 while the grooves 50 and 52 being in fluid communication with the reservoir 34. A pair of annular grooves 53 and 54 are fromed in the outer surface of the valve piston 22. The groove 53 is in fluid communication with the right cylinder 20 while the groove 54 is in fluid communication with the left cylinder 21.

The primary reaction chamber 28 and 29 are in fluid communication with the grooves 53 and 54 through means of orifices 55 and 56, respectively.

In the power assisted steering mechanism as shown in FIG. 4, when the speed of the vehicle is low, the variable orifice 44 establishes the fluid communication between the secondary reaction chambers 30 and 31 and, therefore, the fluid pressure within the chamber 30 is the same as that within the chamber 31. When the valve piston 22 is moved to the right, the groove 53 of the valve piston 22 is brought in communication with the groove 49 of the cylinder 48. Therefore, the fluid under pressure is transmitted from the pump 19 to the right cylinder 20 to thereby assist the movement of the power piston 14. The groove 54 is now in fluid communication with the groove 52 and thus the left cylinder 21 is in communication with the reservoir 34. The grooves 50 and 51 are closed by lands of the valve piston 22. Each of the primary and secondary reaction chambers 28 and 30 receives the fluid under pressure from the pump 19 through means of the orifices 55 and 45, respectively. Since the fluid pressures within the secondary reaction chambers 28 and 30 are the same to each other, the reaction force which corresponds to the difference in pressures between the primary reaction chambers 28 and 29, will act on the valve piston 22. These conditions will be illustrated by the line shown as low speed of vehicle in FIG. 3.

When the speed of the vehicle is high, the variable orifice 44 tends to interrupt or restrict the fluid communication between the secondary reaction chambers 30 and 31. Under these conditions, the rightward movement of the valve piston 22 by means of the valve pin 17 allows the transmission of the fluid under pressure from the pump 19 to the right cylinder 20 through means of the groove 53. At the same time, the left cylinder 21 is brought in communication with the reservoir 34 through means of the groove 54. Therefore, the movement of the power piston 14 is assisted. The fluid under pressure now is transmitted from the pump 19 to both of the primary and secondary chambers 28 and 30 through means of the orifices 55 and 45. Accordingly, the valve piston 22 receives the reaction force from the secondary reaction chamber 30 as well as from the primary reaction chamber 28. This is illustrated by the line shown as high speed of vehicle in FIG. 3.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power assisted steering mechanism comprising:
a worm shaft being in association with a steering wheel,
a power piston having a rack and being in engagement with said worm shaft thrugh means of a steering nut to thereby be moved along said worm shaft,
a sector shaft being in engagement with said rack of said power piston,
right and left cylinders selectively receiving the fluid under pressure to thereby assist the movement of said power piston, and
a control valve means incorporated within said power piston and being operated by a valve pin secured to said steering nut to selectively transmit the fluid under pressure into said right and left cylinders, said control valve means including a valve piston slidably positioned within a further cylinder so as to provide a pair of primary reaction chambers, a pair of secondary reaction chambers formed at both sides of said valve piston, said primary reaction chambers being in fluid communication with said secondary reaction chambers through means of orifices, respectively, and said secondary reaction chambers being fluidically connected to each other through means of a variable orifice which reduces the fluid communication between said secondary reaction chambers in response to a speed of the vehicle.

2. A power assisted steering mechanism as set forth in claim 1, wherein a pressure working area of each of said secondary reaction chambers is greater than that of each of said primary rection chamber.

3. A power assisted steering mechanism as set forth in claim 1, wherein said valve piston has at the outer surface thereof annular grooves which are in communication with a pump and a reservoir, respectively, said annular grooves being in cooperation with annular grooves which are formed in the inner surface of said further cylinder to thereby selectively transmit the fluid under pressure from said pump to said right and left cylinders in response to the movement of said valve piston.

4. A power assisted steering mechanism as set forth in claim 1, wherein said further cylinder has at the inner surface thereof first and second annular grooves in fluid communication with a pump and third and fourth annular grooves in fluid communication with a reservoir, and said valve piston has at the outer surface thereof a first annular groove which is in selective communication with said first and third grooves of said further cylinder and a second annular groove which is in selective communication with said second and forth grooves of said further cylinder in response to the movement of said valve piston.

5. A power assisted steering mechanism as set forth in claim 1, further comprising reaction pistons which are secured to said valve piston to thereby define said primary and secondary reaction chambers.

* * * * *